(12) United States Patent
Angerer

(10) Patent No.: US 10,793,022 B2
(45) Date of Patent: Oct. 6, 2020

(54) SPINDLE GEARBOX AND DRIVE UNIT OF AN ELECTRIC SEAT DRIVE

(71) Applicant: Robert Bosch GmbH, Stuttgart (DE)

(72) Inventor: Christof Angerer, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 16/083,081

(22) PCT Filed: Mar. 2, 2017

(86) PCT No.: PCT/EP2017/054892
§ 371 (c)(1),
(2) Date: Sep. 7, 2018

(87) PCT Pub. No.: WO2017/153243
PCT Pub. Date: Sep. 14, 2017

(65) Prior Publication Data
US 2019/0009693 A1 Jan. 10, 2019

(30) Foreign Application Priority Data

Mar. 7, 2016 (DE) .................. 10 2016 203 639

(51) Int. Cl.
*F16H 25/24* (2006.01)
*B60N 2/02* (2006.01)
(Continued)

(52) U.S. Cl.
CPC ........... *B60N 2/0232* (2013.01); *B60N 2/929* (2018.02); *F16H 25/20* (2013.01); *F16H 57/039* (2013.01);
(Continued)

(58) Field of Classification Search
CPC .............. F16H 25/20; F16H 2025/2031; F16H 2025/2084; F16H 2025/209; F16H 2057/02082
(Continued)

(56) References Cited

U.S. PATENT DOCUMENTS 3,449,971 A 6/1969 Posh
3,798,983 A * 3/1974 Smith ..................... F16H 25/20
74/89.35

(Continued)

FOREIGN PATENT DOCUMENTS

CN 201021711 2/2008
DE 1185031 1/1965
(Continued)

OTHER PUBLICATIONS

International Search Report for Application No. PCT/EP2017/054892 dated May 12, 2017 (English Translation, 2 pages).

*Primary Examiner* — Randell J Krug
(74) *Attorney, Agent, or Firm* — Michael Best & Friedrich LLP

(57) ABSTRACT

The invention relates to a spindle gearbox (1) of an electric seat drive, comprising a gearbox housing (2) for mounting a worm gear (3) and a worm, the worm meshing with the worm gear (3), a threaded spindle (4, 5) connected to the worm gear (3), a first lid (6), and a second lid (7), wherein the first lid (6) and the second lid (7) are fastened parallel to one another on the gearbox housing (2). The threaded spindle (4, 5) is guided through the first lid (6), and the first lid (6) is fastened on the gearbox housing (2) independently of the second lid (7).

16 Claims, 1 Drawing Sheet

(51) Int. Cl.
   *B60N 2/90*   (2018.01)
   *F16H 25/20*  (2006.01)
   *F16H 57/039* (2012.01)
   *F16H 57/02*  (2012.01)
(52) U.S. Cl.
   CPC  *B60N 2002/024* (2013.01); *B60N 2002/0236* (2013.01); *F16H 2025/209* (2013.01); *F16H 2025/2031* (2013.01); *F16H 2025/2084* (2013.01); *F16H 2057/02082* (2013.01)
(58) Field of Classification Search
   USPC ........................................................ 74/89.14
   See application file for complete search history.

(56)             References Cited

U.S. PATENT DOCUMENTS

| | | | |
|---|---|---|---|
| 4,962,963 A | 10/1990 | Robinson | |
| 6,352,006 B1 * | 3/2002 | Kurashita | B60N 2/0232 |
| | | | 74/409 |
| 8,033,192 B2 * | 10/2011 | Oberle | B60N 2/0224 |
| | | | 74/89.23 |
| 8,113,074 B2 * | 2/2012 | Wohrle | B60N 2/0232 |
| | | | 74/89.23 |
| 9,222,296 B2 * | 12/2015 | Hamminga | E05F 15/41 |
| 9,242,578 B2 * | 1/2016 | Oberle | B60N 2/067 |
| 2008/0011114 A1 | 1/2008 | Oberle et al. | |
| 2008/0163708 A1 | 7/2008 | Porinsky et al. | |
| 2012/0118089 A1 * | 5/2012 | Angerer | H02K 7/06 |
| | | | 74/89.23 |

FOREIGN PATENT DOCUMENTS

| | | |
|---|---|---|
| DE | 102006005499 A1 * | 11/2006 |
| DE | 102006009576 | 9/2007 |
| EP | 1101652 | 5/2001 |
| EP | 2538117 | 12/2012 |
| GB | 1132889 | 11/1968 |
| WO | 2016015731 | 2/2016 |

* cited by examiner

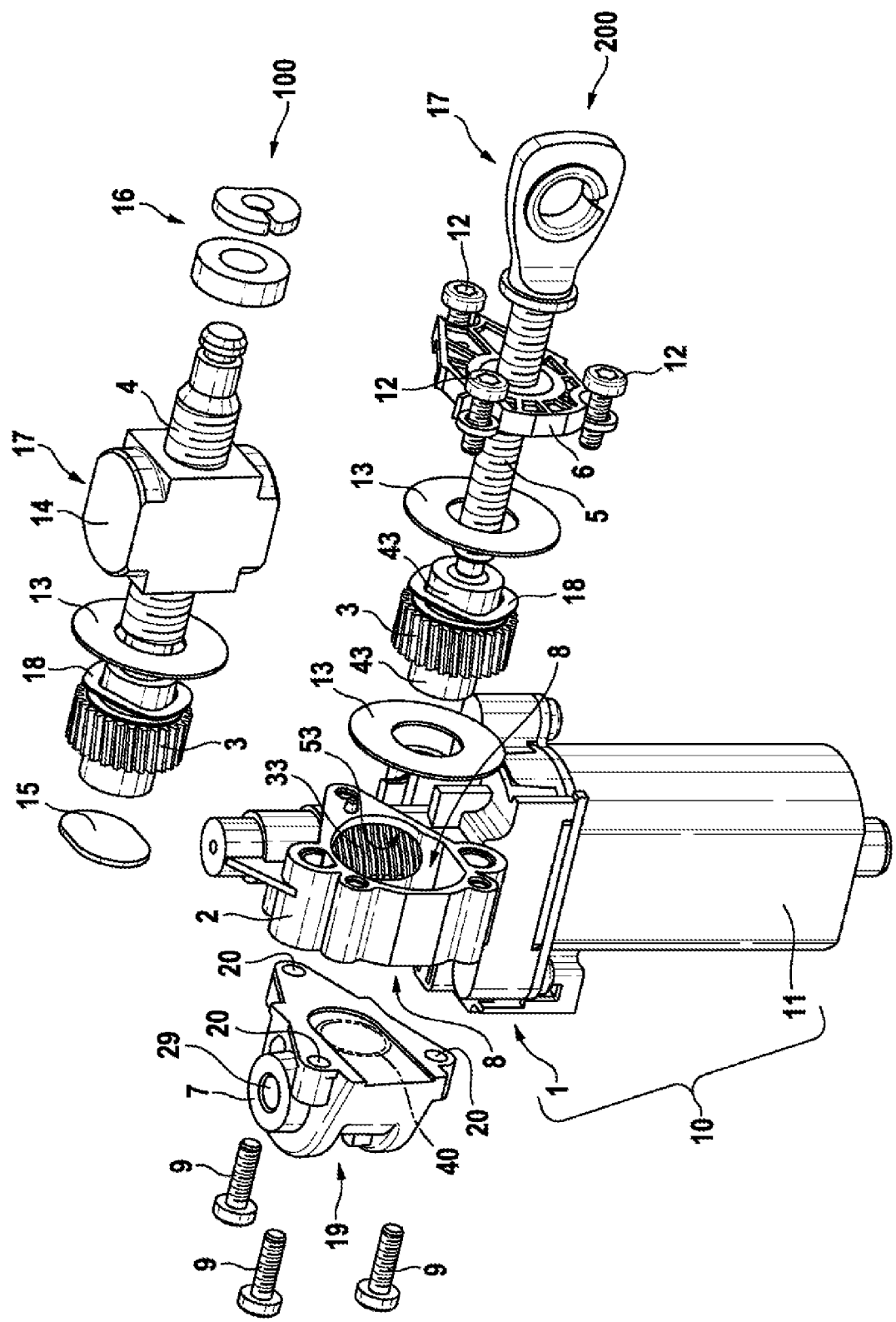

SPINDLE GEARBOX AND DRIVE UNIT OF AN ELECTRIC SEAT DRIVE

BACKGROUND OF THE INVENTION

The present invention relates to a spindle mechanism for an electric seat drive. Moreover, the invention relates to a drive unit for an electric seat drive. In particular, the electric seat drive can be used in a vehicle.

The prior art has disclosed spindle motors, via which a seat can be adjusted electrically. If a seat of this type is used in a vehicle, the spindle motor has to be capable of absorbing both operating forces and crash forces via a mechanism housing. Here, the mechanism housing has a customer interface, via which the mechanism housing can be fastened to further components of the vehicle or of the seat. A mounting direction, in which the spindle is inserted into the mechanism housing, is usually oriented perpendicularly with respect to the spindle axis.

A design as shown in the prior art has some disadvantages, however. For instance, it is firstly not possible to use the drive for both a left-hand and a right-hand embodiment. Rather, different mechanism housings have to be provided here. A left-hand embodiment is understood to mean, in particular, that the spindle mechanism can be used for the adjustment of a seat which is installed on the left in a vehicle in the driving direction. Likewise, a right-hand embodiment is understood to mean a use capability of the spindle mechanism for an adjustment of a seat which is installed on the right in the driving direction. Moreover, the modularity and therefore the use of identical parts in different applications by way of a mounting concept as in the prior art are greatly restricted.

SUMMARY OF THE INVENTION

The spindle mechanism according to the invention of an electric seat drive makes a reduction of the multiplicity of parts possible, as a result of which, in particular, a cost reduction is achieved. In particular, a mechanism housing of the spindle mechanism permits both a left-hand embodiment and a right-hand embodiment of the spindle mechanism. The spindle mechanism can therefore be used in a modular manner. Moreover, a crash strength can be set in a modular manner, by it being possible for individual components to be manufactured from materials with a different strength. The spindle mechanism according to the invention of an electric seat drive comprises a mechanism housing, a threaded spindle, and a first cover and a second cover. The mechanism housing is configured for mounting a worm gear and a worm, and can be in one piece or in multiple pieces. It is provided here that the worm meshes in the worm gear. The threaded spindle is connected to the worm gear. In this way, a transmission of force and/or a transmission of torque between the worm gear and a threaded spindle are/is made possible. The first cover and the second cover are fastened to the mechanism housing parallel to one another. In particular, the first cover and the second cover extend parallel to the worm gear. It is provided here that the threaded spindle is guided through the first cover. It is preferred, in particular, that the first cover and the second cover cover the worm gear. It is provided, moreover, that the first cover is fastened to the mechanism housing independently of the second cover. The second cover has, in particular, a variable connection geometry, via which the spindle mechanism can be fastened to a component of a vehicle or of a seat. Since the second cover is a separate component, said connection geometry can be of different configuration for different applications. The first cover has, in particular, a seal element, by way of which the first cover can be sealed with respect to the threaded spindle which is guided through the first cover. As a result of the fastening of the first cover independently of the second cover, the spindle mechanism is of modular construction, since the first cover can be replaced, in particular, independently of the second cover. In this way, the first cover and/or the second cover can be individually adapted to existing boundary conditions, in particular with regard to operating forces and/or crash forces which are to be absorbed.

The mechanism housing is preferably of symmetrical configuration with respect to a plane perpendicularly with respect to the threaded spindle. The plane of symmetry lies, in particular, centrally in the mechanism housing between the first cover and the second cover. It is made possible in this way that both the first cover and the second cover can be attached on all sides of the mechanism housing, as a result of which the threaded spindle can be mounted on all sides of the mechanism housing. In this way, in particular, mounting in the left-hand and right-hand embodiments in the case of the use of the same spindle mechanism is made possible.

In particular, in each case one opening of the mechanism housing can be closed by way of the first cover and the second cover. It is provided here that the respective openings run perpendicularly with respect to the threaded spindle. It is provided, in particular, that each opening of the mechanism housing can be closed by way of each cover, that is to say both by way of the first cover and by way of the second cover. In this way, a modularity of the spindle mechanism is ensured. The mechanism housing preferably has two openings of this type.

The mechanism housing is closed, advantageously completely, by way of the first cover and the second cover. One exception to this is formed by merely one existing drive opening for attaching a drive motor to the worm. The drive opening is irrelevant to the invention and is therefore not taken into consideration. It is therefore provided, in particular, that the mechanism housing has merely two openings, each of the openings being closed by way of either the first cover or the second cover. The respective openings are particularly advantageously closed completely by way of the first cover and the second cover. In particular, there are therefore no additional covers.

The first cover and the second cover can advantageously be screwed to the mechanism housing independently of one another. In this way, there is a secure and reliable connection between the first cover and the mechanism housing and between the second cover and the mechanism housing. Both the first cover and the second cover can be replaced very easily and with low complexity as a result of the individual screw connection of the first cover and the second cover, as a result of which a high modularity is ensured. In particular, the first cover and/or the second cover can be replaced in such a way that, depending on the application, an adapted, in particular high strength, material is used.

It is preferably provided in one alternative that the spindle mechanism has at least one mounting screw. The at least one mounting screw fastens the first cover or simultaneously the first cover and the second cover to the counter-element. In this way, in particular, mounting of the two covers on the mechanism housing is simplified. The first cover particularly advantageously has a counter-thread, in which the mounting screw can be screwed. The counter-thread can also be a thread which is produced by the mounting screw itself. If the second cover is to be fastened to the mechanism housing by way of the mounting screw in addition to the first cover, it is preferably provided that the second cover has at least one bore, through which the mounting screw can be guided.

In one advantageous embodiment, the first cover and/or the second cover are/is configured in each case in one piece. It is provided, in particular, that the first cover and/or the second cover are/is in each case a cast part. By way of the single piece configuration, both the first cover and the second cover can be manufactured very simply and inexpensively. Moreover, mounting of the spindle mechanism is simplified.

The first cover and/or the second cover are/is advantageously manufactured from a plastic or metal. It is provided here, in particular, that there is manufacturing from metal when increased crash forces are to be absorbed. Manufacturing from plastic is firstly weight saving, and secondly inexpensive and low in production complexity.

The threaded spindle is preferably a rotatable spindle or a plunger spindle. In the case of the rotatable spindle, the threaded spindle is connected fixedly to the worm gear so as to rotate with it, as a result of which a rotation by the worm gear can be transmitted to the rotatable spindle. The rotatable spindle has a spindle nut which is guided on the rotatable spindle, the spindle nut being arranged fixedly so as to rotate with said rotatable spindle. The spindle nut can therefore be displaced by way of rotation of the rotatable spindle.

The spindle nut is preferably connected to a component of a seat, as a result of which the seat can be displaced relative to the spindle mechanism. If, in contrast, the threaded spindle is a plunger spindle, it is provided that the plunger spindle is arranged fixedly in terms of rotation. In particular, no transmission of a rotation from the worm gear to the plunger spindle takes place. Rather, it is provided that the worm gear converts a rotation into a translation of the plunger spindle. This is achieved, in particular, by virtue of the fact that the worm gear has an internal thread, into which a thread of the plunger spindle engages. The plunger spindle is advantageously fastened fixedly to a component of the seat so as to rotate with it, as a result of which in turn a movement of the seat relative to the spindle mechanism is made possible.

Therefore, the invention comprises a system consisting of the identical components of the mechanism housing, the first housing cover and the second housing cover, it being possible, as an alternative, for either a plunger spindle or a rotatable spindle to be mounted in the mechanism housing.

If receptacles for fastening elements are configured as a vehicle connection geometry on the mechanism housing, the seat drive can then also be fastened to the seat or to the vehicle if a plunger spindle is mounted in the mechanism housing, which plunger spindle, through a central opening in the cover, blocks the path for a joint pin in the through bore transversely with respect to the mechanism spindle axis.

If the first cover has a central through opening for mounting the plunger spindle in the direction of the threaded spindle axis, which central through opening can be closed by way of a compensation washer, the same cover can be used to mount both a plunger spindle through the through opening and, as an alternative, to mount a rotatable spindle which optionally bears axially against the compensation washer.

To this end, a recess for receiving the compensation washer is shaped out in the first cover, with the result that the first cover bears flush against the mechanism housing with or without a compensation washer.

Finally, the invention relates to a drive unit of an electric seat drive. The drive unit comprises a drive motor and a spindle mechanism as described above. It is provided here that the worm is driven by the drive motor. The drive unit according to the invention can therefore be used in a modular manner, since, in particular, different first covers and/or second covers can be attached, in order for it to be possible for different operating forces and/or crash forces to be absorbed. Moreover, the drive unit advantageously permits mounting in the left-hand embodiment and in the right-hand embodiment, as a result of which the drive unit can be used in a versatile manner. In this way, in particular, the requirements for additional components are reduced.

BRIEF DESCRIPTION OF THE DRAWING

In the following text, exemplary embodiments of the invention will be described in detail with reference to the accompanying drawing, in which:

FIG. 1 shows a diagrammatic depiction of a drive unit in accordance with one exemplary embodiment of the invention.

DETAILED DESCRIPTION

FIG. 1 shows a drive unit 10 in accordance with one embodiment of the invention. The drive unit 10 comprises a spindle mechanism 1 and a drive motor 11. It is provided here that a seat adjustment of a seat of a motor vehicle is made possible by way of the drive unit.

In order to adjust the seat, the spindle mechanism 1 has a mechanism housing 2, in which both a worm gear 3 and a worm 33 can be mounted. The worm 33 can be driven by the drive motor 11 and is arranged, in particular, on the armature shaft of the latter. The worm 33 engages through a lateral opening 53 in the mechanism housing 2 and meshes with the worm gear 3, with the result that a rotation can be transmitted to the worm gear 3. In turn, a threaded spindle 4, 5 can be driven by the worm gear 3, via which threaded spindle 4, 5 the seat can be moved.

The mechanism housing 2 has a drive opening (not visible), through which a connection between the drive motor 11 and the worm is made possible. The drive opening is covered by way of a fastening of the drive motor 11 to the mechanism housing 2. In FIG. 1, the armature shaft of the drive motor 11 engages here through the drive opening into the mechanism housing 2. As an alternative, the mechanism housing 2 comprises, in particular, the entire drive motor 11.

FIG. 1 shows two different embodiments of the spindle mechanism 1 which differ, in particular, in terms of the type of threaded spindle 4, 5. In a first embodiment 100, a rotatable spindle 4 is used, and a plunger spindle 5 is used in a second embodiment 200, the mechanism housing 2 and the first and second cover 6, 7 being identical in the case of the two embodiments.

In the first embodiment 100, that is to say in the case of the use of the rotatable spindle 4, the worm gear 3 is connected fixedly to the rotatable spindle 4 so as to rotate with it. In this way, a transmission of a rotation from the worm gear 3 to the rotatable spindle 4 is made possible. A spindle nut 14 is attached on the rotatable spindle 4, the spindle nut 14 being fixed in terms of rotation thereon. In this way, a translation of the spindle nut 14 along a center axis of the rotatable spindle 4 takes place in the case of rotation of the worm gear 3 and therefore of the rotatable spindle 4. Moreover, the rotatable spindle 4 has an end stop 16, at which the translational movement of the spindle nut 14 is stopped.

Furthermore, there is a zigzag spring 18, via which a play of the rotatable spindle 4 and of the worm gear 3 can be compensated for. A central through opening for the plunger spindle can be covered by means of a compensation washer 15, in order to mount the rotatable spindle within the mechanism housing 2. The compensation washer 15 is inserted into a recess in the second cover 7 and closes the mechanism housing 2 axially. Finally, there is a stop disk 13.

If the threaded spindle 4, 5 is a plunger spindle 5 in accordance with the second embodiment 200, the plunger spindle 5 is fastened to the worm gear 3 in such a way that no rotation can be transmitted between the worm gear 3 and the plunger spindle 5. Rather, a rotation of the worm gear 3 brings about a translation of the plunger spindle 5 relative to the worm gear 3. In particular, the worm gear 3 has an internal thread, into which a thread of the plunger spindle 5 engages. The plunger spindle 5 is arranged in a rotationally fixed manner, with the result that a displacement of the plunger spindle 5 by way of the worm gear 3 takes place upon rotation of the worm gear 3.

There is once again preferably a zigzag spring 18, via which a play of the worm gear 3 and/or of the plunger spindle 5 can be compensated for. There are likewise two stop disks 13.

There is in each case one seat connection geometry 17 both in the case of the first embodiment 100 and in the case of the second embodiment 200, via which seat connection geometry 17 the drive unit 10 can be connected to a seat of a vehicle. In the first embodiment, the seat connection geometry 17 is attached on the spindle nut 14 and, in the second embodiment, the seat connection geometry 17 is arranged at one end of the plunger spindle 5. In the second embodiment 200, it is preferably provided that the rotationally fixed arrangement of the plunger spindle 5 is achieved via the seat connection geometry 17 which is connected to a component of the seat.

The mechanism housing 2 is, in particular, of axially symmetrical configuration with regard to the center axis of the threaded spindle 4, 5. The symmetry extends, in particular, with respect to a plane which is arranged centrally between two axial openings 8. The two openings 8 are, in particular, of identical configuration. It is therefore provided that each of the openings 8 can be closed either by a first cover 6 or by a second cover 7. For the correct positioning of the cover 6, 7, centering elements, for example axially extending centering pins, are provided on the mechanism housing 2. Said centering elements then engage into corresponding counter-centering elements (for example axial holes) in the covers 6, 7. The threaded spindle 4, 5 is guided through a cutout in the first cover 6. The second cover 7 has a vehicle connection geometry 19, via which the second cover 7 and therefore the drive unit 10 can be fastened to a further component of the vehicle. For example, the vehicle connection geometry 19 is configured as a through bore 29 in the second cover 7 transversely with respect to the center axis of the threaded spindle 4, 5, which through bore 29 can rotatably receive a joint pin (not shown). Here, the second cover 7 is configured as a plastic injection molded part, with the result that the forces can be absorbed from the joint pin in a manner which is free from noise. The worm gear 3 has two axial projections 43 which are configured for radially mounting the worm gear 3 by means of plain bearings. To this end, cylindrical, axially extending bearing bushes 40 are formed in the covers 6, 7, which bearing bushes 14 receive the two axial projections 43 for radial mounting in the finally mounted state. As a result, the symmetrically configured bearing bushes 40 form a radial bearing for the worm gear 3. Therefore, different spindle modules can be attached on the left-hand side or right-hand side on the unchanged mechanism housing main body 2, as a modular kit. Here, both the radial and the axial support of the worm gear 3 is preferably realized merely by way of the two covers 6, 7 and, in particular, not directly by way of the mechanism housing main body 2.

The drive unit 10 can be used in a modular manner as a result of the variable attachment either of the first cover 6 or of the second cover 7 on the respective openings 8. It is made possible, in particular, to position the threaded spindle 4, 5 as in FIG. 1, or to swap the positions of the first cover 6 and the second cover 7 which are shown in FIG. 1. In this way, a change can be carried out between a mounting of the drive unit 10 in the left-hand embodiment and the right-hand embodiment.

The first cover 6 and the second cover 7 can be attached on the mechanism housing 2 independently of one another. In FIG. 1, there are first fastening elements 12 and second fastening elements 9, the first fastening elements 12 being provided for fastening the first cover 6 to the mechanism housing 2, whereas the second fastening elements 9 make fastening of the second cover 7 to the mechanism housing 2 possible. The spindle mechanism 1 and therefore the drive unit 10 can be constructed in a modular manner as a result of the first cover 6 and second cover 7 which can be attached independently of one another. In particular, different first covers 6 or second covers 7 which are manufactured from different materials can be replaced easily, as a result of which different absorption capabilities of operating forces and/or crash forces by way of the drive unit 10 are made possible. The first fastening elements 12 and the second fastening elements 9 are preferably screws.

In one alternative embodiment, there are merely the second fastening elements 9 in the form of mounting screws. The mounting screws permit fastening of the first cover 6 or simultaneously the first cover 6 and the second cover 7 to the mechanism housing 2. To this end, it is provided, in particular, that the first cover 6 has threads, into which the mounting screws engage. If, in addition to the first cover, the second cover is also to be fastened by way of the mounting screws, it is thus provided that the mounting screws are guided through openings 20 of the second cover 7. Therefore, manufacturing of the drive unit 10 is simplified by way of the provision of merely the second fastening elements 9 as mounting screws. It is always ensured here that the first cover 6 can be arranged on the mechanism housing 2 independently of the second cover 7.

Moreover, it can be seen from FIG. 1 that a mounting direction of the spindle mechanism 1 takes place along a center axis of the threaded spindle 4, 5. In this way, there is a mold split perpendicularly with respect to the center axis of the threaded spindle 4, 5. Moreover, it can be seen from FIG. 1 that, in addition to the mechanism housing 2 and the two covers 6, 7, a multiplicity of components are identical between the embodiment with a rotatable spindle 4 and the embodiment with a plunger spindle 5. In particular, the stop disks 13, the zigzag spring 18 and partially the worm gear 3 are identical. This leads to a reduced manufacturing and mounting complexity of the drive unit 10, as a result of which the drive unit 10 can be produced inexpensively.

What is claimed is:

1. A spindle mechanism (1) of an electric seat drive, comprising
   a mechanism housing (2) for mounting a worm gear (3) and a worm (33), the worm (33) meshing with the worm gear (3), a threaded spindle (4, 5) which is connected to the worm gear (3) and which has an axis, wherein the mechanism housing (2) is configured to have the threaded spindle (4, 5) inserted into the mechanism housing (2), a first cover (6), and a second cover (7), the first cover (6) and the second cover (7) being fastened parallel to one another to the mechanism housing (2), the threaded spindle (4, 5) being guided through the first cover (6), and the first cover (6) being fastened to the mechanism housing (2) independently of the second cover (7), wherein the threaded spindle (4, 5) is a rotatable spindle (4) or a plunger spindle (5), wherein the second cover (7) has a central through opening in the direction of the axis, the central through opening being configured for mounting the plunger spindle (5), and wherein the central through opening is configured to be closed by a compensation plate (15) that is configured to bear axially against the rotatable spindle (4).

2. The spindle mechanism (1) as claimed in claim 1, characterized in that a first face of the mechanism housing (2) is symmetrical with respect to a plane perpendicularly with respect to the threaded spindle (4, 5) to a second face of the mechanism housing (2).

3. The spindle mechanism (1) as claimed in claim 1, characterized in that the mechanism housing (2) has openings (8) along the threaded spindle axis, wherein the openings (8) are of symmetrical configuration, each opening (8) being configured to be closed by the first cover (6) or the second cover (7).

4. The spindle mechanism (1) as claimed in claim 1, characterized in that the mechanism housing (2) is closed completely by the first cover (6) and the second cover (7), except for a drive opening for attaching a drive motor (11) to the worm (33) which is not closed by the first cover (6) and the second cover (7).

5. The spindle mechanism (1) as claimed in claim 1, characterized in that the first cover (6) and the second cover (7) are screwed to the mechanism housing (2) independently of one another.

6. The spindle mechanism (1) as claimed in claim 1, characterized by at least one mounting screw (12, 9), the mounting screw (12, 9) fastening the first cover (6) or simultaneously the first cover (6) and the second cover (7) to the mechanism housing (2).

7. The spindle mechanism (1) as claimed in claim 1, characterized in that the first cover (6) and/or the second cover (7) are/is of a single piece configuration.

8. The spindle mechanism (1) as claimed in claim 1, characterized in that the first cover (6) and/or the second cover (7) are/is manufactured from a plastic material or a metal material.

9. The spindle mechanism (1) as claimed in claim 1, characterized in that the second cover (7) has a cylindrical bearing bush (40), into which axial projections (43) of the worm gear (3) engage axially.

10. The spindle mechanism (1) as claimed in claim 1, characterized in that a through bore (29) is configured as a vehicle connection geometry (19) transversely with respect to the threaded spindle axis on the second cover (7).

11. The spindle mechanism (1) as claimed in claim 1, characterized in that receptacles for fastening elements are configured as a vehicle connection geometry (19) on the mechanism housing (2).

12. The spindle mechanism (1) as claimed in claim 1, characterized in that a recess for receiving the compensation plate (15) is provided in the second cover (7), wherein the second cover (7) bears tightly against the mechanism housing (2) with or without the compensation plate (15).

13. The spindle mechanism (1) as claimed in claim 1, characterized in that the mechanism housing (2) has openings (8) along the threaded spindle axis, wherein the openings (8) are of symmetrical configuration with regard to a threaded spindle axis, each opening (8) being configured to be closed by the first cover (6) or the second cover (7).

14. The spindle mechanism (1) as claimed in claim 1, wherein the threaded spindle (4, 5) is the rotatable spindle (4), and wherein a through bore (29) is configured as a vehicle connection geometry (19) transversely with respect to the threaded spindle axis on the second cover (7) for fastening the seat drive which requires the rotatable spindle (4).

15. The spindle mechanism (1) as claimed in claim 1, wherein the threaded spindle (4, 5) is the plunger spindle (5), and wherein receptacles for fastening elements are configured as a vehicle connection geometry (19) on the mechanism housing (2) for fastening the seat drive which requires the plunger spindle (5).

16. A drive unit (10) of an electric seat drive, comprising:

a spindle mechanism (1) including a mechanism housing (2) for mounting a worm gear (3) and a worm (33), the worm (33) meshing with the worm gear (3), a rotatable spindle (4) which is connected to the worm gear (3), which has an axis, and which is inserted into the mechanism housing (2), a first cover (6), and a second cover (7), the first cover (6) and the second cover (7) being fastened parallel to one another to the mechanism housing (2), the rotatable spindle (4) being guided through the first cover (6), and the first cover (6) being fastened to the mechanism housing (2) independently of the second cover (7), wherein the second cover (7) has a central through opening in the direction of the axis, and wherein the central through opening in the second cover (7) is closed by a compensation plate (15) such that the rotatable spindle (4) bears axially against the compensation plate (15); and a drive motor (11), wherein the worm (33) of the spindle mechanism (1) is driven by the drive motor (11).

* * * * *